(12) United States Patent
Zhao

(10) Patent No.: US 11,438,842 B2
(45) Date of Patent: Sep. 6, 2022

(54) COMMUNICATION CONFIGURATION METHOD AND DEVICE

(71) Applicant: China Academy of Telecommunications Technology, Beijing (CN)

(72) Inventor: Yali Zhao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 16/088,448

(22) PCT Filed: Feb. 23, 2017

(86) PCT No.: PCT/CN2017/074560
§ 371 (c)(1),
(2) Date: Sep. 26, 2018

(87) PCT Pub. No.: WO2017/166961
PCT Pub. Date: Oct. 5, 2017

(65) Prior Publication Data
US 2019/0090198 A1    Mar. 21, 2019

(30) Foreign Application Priority Data

Mar. 28, 2016 (CN) .......................... 201610184722.6

(51) Int. Cl.
*H04W 76/28* (2018.01)
*H04W 52/02* (2009.01)
(Continued)

(52) U.S. Cl.
CPC ......... *H04W 52/0261* (2013.01); *H04W 4/70* (2018.02); *H04W 8/005* (2013.01);
(Continued)

(58) Field of Classification Search
CPC ....... H04W 76/14; H04W 8/005; H04W 4/70; H04W 36/03; H04W 72/04; H04W 76/11;
(Continued)

(56) References Cited

U.S. PATENT DOCUMENTS

| 2014/0235248 A1* | 8/2014 | Chai ................. H04W 36/0083 455/436 |
| 2015/0055532 A1* | 2/2015 | Lu ..................... H04W 52/0225 370/311 |

(Continued)

FOREIGN PATENT DOCUMENTS

| WO | 2015170866 A1 | 11/2015 |
| WO | 2016022924 A1 | 2/2016 |

OTHER PUBLICATIONS

ETSI TS 136 311 v.13, Jan. 2016 (Year: 2016).*
(Continued)

*Primary Examiner* — Jae Y Lee
*Assistant Examiner* — Aixa A Guadalupe Cruz
(74) *Attorney, Agent, or Firm* — Kilpatrick Townsend & Stockton, LLP

(57) ABSTRACT

The embodiments of the present invention are relate to wireless communications. In the embodiments of the present invention, a first terminal determines configuration information for determining a target communication period, wherein the target communication period is a period in which direct communication interface sending and/or receiving can be performed by means of a direct communication interface; and the first terminal determines the target communication period according to the configuration information and notifies a second terminal of the configuration information by means of the direct communication interface, so that the terminal performing direct communication determines the target communication period according to the configuration information and performs direct communication interface (Continued)

sending and/or receiving in the target communication period. Therefore, there is no need to continuously monitor a system broadcast or continuously monitor a pre-configured D2D receiving resource, thereby saving power.

10 Claims, 9 Drawing Sheets

(51) Int. Cl.
| | |
|---|---|
| *H04W 76/10* | (2018.01) |
| *H04W 72/04* | (2009.01) |
| *H04W 76/23* | (2018.01) |
| *H04W 76/14* | (2018.01) |
| *H04W 4/70* | (2018.01) |
| *H04W 8/00* | (2009.01) |
| *H04W 92/18* | (2009.01) |

(52) U.S. Cl.
CPC ....... *H04W 52/0216* (2013.01); *H04W 72/04* (2013.01); *H04W 76/10* (2018.02); *H04W 76/14* (2018.02); *H04W 76/23* (2018.02); *H04W 76/28* (2018.02); *H04W 92/18* (2013.01); *Y02D 30/70* (2020.08)

(58) Field of Classification Search
CPC ............. H04W 76/23; H04W 36/0069; H04W 72/048; H04L 67/1063; H04L 29/08306; H04L 5/0048; H04L 67/104
See application file for complete search history.

(56) References Cited

U.S. PATENT DOCUMENTS

| | | | |
|---|---|---|---|
| 2015/0208452 A1* | 7/2015 | Lee | H04W 76/27 455/426.1 |
| 2015/0257187 A1* | 9/2015 | Kwon | H04L 12/18 370/329 |
| 2016/0345307 A1* | 11/2016 | Huang | H04W 48/10 |
| 2017/0048829 A1* | 2/2017 | Kim | H04W 72/1289 |
| 2017/0188411 A1* | 6/2017 | Siomina | H04W 52/0216 |
| 2018/0014347 A1* | 1/2018 | Nagasaka | H04W 52/0225 |
| 2020/0383168 A1* | 12/2020 | Nagasaka | H04W 52/0225 |

OTHER PUBLICATIONS

Intel Corporation: "Discussion on the LTE Rel.14 scope for D2D enhancements", 3GPP Draft; RP-160428 Intel—FED2D R14 Scope, 3rd Generation Partnership Project(3GPP), Mobile Competence Centre: 650, Route Des Lucioles ; F-06921 Sophia-Antipolis Cedex ; France vol. TSG RAN, No. Goteborg; Mar. 7, 2016-Mar. 10, 2016, Mar. 6, 2016 (Mar. 6, 2016), XP051076368, 3 pages.

Intel: "Motivation for SI: Further LTE D2D Enhancements for Wearables and MTC", 3GPP Draft; RP-160427 Intel—FED2D—Slides, 3rd Generation Partnership Project (3GPP), Mobile Competence Centre; 650, Route Des Lucioles; F-06921 Sophia-Antipolis Cedex; France vol. TSG RAN, No. Goteborg Mar. 7, 2016-Mar. 10, 2016, Mar. 6, 2016 (Mar. 6, 2016), XP051076367, 14 pages.

* cited by examiner

COMMUNICATION CONFIGURATION METHOD AND DEVICE

This application is a National Stage of International Application No. PCT/CN2017/074560, filed on Feb. 23, 2017 which claims the benefit of Chinese Patent Application No. 201610184722.6, filed with the Chinese Patent Office on Mar. 28, 2016, and entitled "A method and device for configuring communication", both of which are hereby incorporated by reference in their entireties.

FIELD

The present invention relates to the field of wireless communications, and particularly to a method and device for configuring communication.

BACKGROUND

In the $3^{rd}$ Generation Partnership Project (3GPP), a Device to Device (D2D) proximity service is different from traditional cellular network communication. For traditional cellular network communication, all the data shall be transmitted over a network; and for D2D communication, a link for direct communication can be set up between terminals as illustrated in FIG. 1.

D2D communication generally falls into the following two categories.

D2D Discovery (proximity service discovery): a User Equipment (UE) determines another proximate UE over an Evolved Universal Terrestrial Radio Access (E-UTRA) network. For example, a D2D UE can search for a proximate taxi, a proximate friend, etc., using this service. In a 3GPP system, the D2D line is also referred to as a Side Link, so the D2D Discovery is also referred to as a Side Link Discovery.

D2D communication (proximity service communication): a link is established directly between two UEs proximate to each other (as illustrated in FIG. 1), so that a communication link originally over the network is converted into a local direct communication link to thereby save a significant bandwidth and improve the efficiency of the network; or two UEs proximate to each other can be provided with a stable, high-speed, and cheap communication service through communication over a direct link. Proximity service communication is generally conducted under the control or assistance of the network side, and even an evolved Node B (eNB) may allocate a resource dynamically for a UE in proximity service communication. In the 3GPP system, the D2D link is also referred as a Side Link, so D2D Communication is also referred to as Side Link Communication.

A UE participating in D2D discovery or communication plays the following two roles.

A D2D transmitting UE is a UE transmitting a D2D discovery or communication message.

A D2D receiving UE which is a UE receiving a D2D discovery or communication message transmitted by a D2D transmitting UE.

For a D2D receiving UE in the R13 and earlier releases, the UE receives a D2D discovery or communication signal according to a system broadcast or a preconfigured D2D receive resource pool. The system broadcast or the preconfigured D2D receive resource pool including D2D transmit resource pools of all the D2D transmitting UE is generally so large that the D2D receiving UE needs to listen constantly to the system broadcast or the preconfigured D2D receive resources, and thus may consume significant power.

In summary, the existing D2D receiving UE needs to listen constantly to the system broadcast or the preconfigured D2D receive resources, and thus may consume significant power.

SUMMARY

The invention provides a method and device for configuring communication so as to address the problem in the related art that the D2D receiving UE needs to listen constantly to the system broadcast or the preconfigured D2D receive resources, and thus may consume significant power.

An embodiment of the invention provides a method for configuring communication, the method including:

determining, by a first terminal, configuration information for determining a target communication period of time, wherein the target communication period of time is a period of time in which direct communication interface transmission and/or reception can be performed via a direct communication interface; and determining, by the first terminal, the target communication period of time according to the configuration information, and notifying a second terminal of the configuration information via the direct communication interface.

Optionally determining, by the first terminal, the configuration information for determining the target communication period of time includes:

determining, by the first terminal, the configuration information according to a part or all of the following parameters:

a traffic type of direct communication;

a traffic characteristic of direct communication;

SPS configuration of the first terminal and/or the second terminal; and

DRX and/or DTX configuration information for the first terminal and/or the second terminal over a Uu interface.

Optionally determining, by the first terminal, the configuration information for determining the target communication period of time includes:

receiving, by the first terminal, the configuration information from a first network-side device.

Optionally before the first terminal receives the configuration information from the first network-side device, the method further includes:

transmitting, by the first terminal, desirable configuration information to the first network-side device, so that the first network-side device determines the configuration information to be transmitted to the first terminal, according to the received desirable configuration information.

Optionally notifying, by the first terminal, the second terminal of the configuration information via the direct communication interface further includes:

notifying, by the first terminal, the second terminal of the identifier of the first terminal, and the identifier of the second terminal together with the configuration information.

Optionally there is a uni-cast communication between the first terminal and the second terminal, and the identifier of the first terminal, and the identifier of the second terminal are layer-2 identifiers over the direct communication interface; or there is a broadcast communication between the first terminal and the second terminal, and the identifier of the first terminal, and the identifier of the second terminal is a layer-2 group identifier or a layer-2 broadcast identifier of a direct communication interface.

Optionally the configuration information includes a part or all of the following information:
onDurationTimer;
drx-InactivityTimer;
drx-RetransmissionTimer;
LongDRX-CycleStartOffset;
LongDTX-CycleStartOffset;
ShortDRX-Cycle;
ShortDTX-Cycle;
DrxShortCycleTimer; and
DtxShortCycleTimer.

An embodiment of the invention provides a method for configuring communication, the method including:

receiving, by a second terminal, configuration information for determining a target communication period of time from a first terminal, wherein the target communication period of time is a period of time in which direct communication interface transmission and/or reception can be performed via a direct communication interface; and determining, by the second terminal, the target communication period of time according to the configuration information.

Optionally after the second terminal receives the configuration information for determining the target communication period of time from the first terminal, the method further includes:

if the second terminal does not access a first network-side device, then transmitting, by the second terminal, the configuration information to an accessed second network-side device.

An embodiment of the invention provides a method for configuring communication, the method including:

determining, by a first network-side device, configuration information for determining a target communication period of time, wherein the target communication period of time is a period of time in which direct communication interface transmission and/or reception can be performed via a direct communication interface; and transmitting, by the first network-side device, the configuration information to a first terminal, so that the first determine determines the target communication period of time according to the configuration information, and notifying a second terminal of the configuration information.

Optionally determining, by the first network-side device, the configuration information for determining the target communication period of time includes:

determining, by the first network-side device, the configuration information according to a part or all of the following parameters:

a traffic type of direct communication;
a traffic characteristic of direct communication;
SPS configuration of the first terminal and/or the second terminal; and
DRX and/or DTX configuration information for the first terminal and/or the second terminal over a Uu interface.

Optionally determining, by the first network-side device, the configuration information for determining the target communication period of time further includes:

determining, by the first network-side device, the configuration information to be transmitted to the first terminal, according to received configuration information desirable to the first terminal.

Optionally if the parameters for determining the configuration information include DRX and/or DTX configuration information for the second terminal over a Uu interface, and the second terminal does not access the first network-side device, then before the first network-side device determines the configuration information for determining the target communication period of time, the method further includes:

obtaining, by the first network-side device, the current DTX and/or DRX configuration of the second terminal over the Uu interface through a second network-side device accessed by the second terminal; or obtaining, by the first network-side device, configuration information desirable to the second terminal through a second network-side device accessed by the second terminal.

Optionally after the first network-side device determines the configuration information for determining the target communication period of time, the method further includes:

determining, by the first network-side device, a resource for direct communication according to the configuration information; and/or modifying, by the first network-side device, DRX and/or DTX configuration of the first terminal over a Uu interface according to the configuration information.

Optionally the configuration information includes a part or all of the following information:
onDurationTimer;
drx-InactivityTimer;
drx-RetransmissionTimer;
LongDRX-CycleStartOffset;
LongDTX-CycleStartOffset;
ShortDRX-Cycle;
ShortDTX-Cycle;
DrxShortCycleTimer; and
DtxShortCycleTimer.

An embodiment of the invention provides a method for configuring communication, the method including:

receiving, by a second network-side device, configuration information, for determining a target communication period of time, transmitted by a second terminal, wherein the target communication period of time is a period of time in which direct communication interface transmission and/or reception can be performed via a direct communication interface, and the configuration information is transmitted by a first terminal to the second terminal; and determining, by the second network-side device, a resource for direct communication according to the configuration information; and/or modifying DRX and/or DTX configuration of the second terminal over a Uu interface according to the configuration information.

An embodiment of the invention provides a first terminal for configuring communication, the first terminal including:

a first information determining module configured to determine configuration information for determining a target communication period of time, wherein the target communication period of time is a period of time in which direct communication interface transmission and/or reception can be performed via a direct communication interface; and a notifying module configured to determine the target communication period of time according to the configuration information, and to notify a second terminal of the configuration information via the direct communication interface.

Optionally the first information determining module is configured to determine the configuration information according to a part or all of the following parameters:

a traffic type of direct communication;
a traffic characteristic of direct communication;
SPS configuration of the first terminal and/or the second terminal; and
DRX and/or DTX configuration information for the first terminal and/or the second terminal over a Uu interface.

Optionally the first information determining module is configured:

to receive the configuration information from a first network-side device.

Optionally the first information determining module is further configured:

to transmit desirable configuration information to the first network-side device, so that the first network-side device determines the configuration information to be transmitted to the first terminal, according to the received desirable configuration information.

Optionally the notifying module is further configured:

to notify the second terminal of the identifier of the first terminal, and the identifier of the second terminal together with the configuration information.

Optionally there is a uni-cast communication between the first terminal and the second terminal, and the identifier of the first terminal, and the identifier of the second terminal are layer-2 identifiers over the direct communication interface; or there is a broadcast communication between the first terminal and the second terminal, and the identifier of the first terminal, and the identifier of the second terminal is a layer-2 group identifier or a layer-2 broadcast identifier of a direct communication interface.

Optionally the configuration information includes a part or all of the following information:
onDurationTimer;
drx-InactivityTimer;
drx-RetransmissionTimer;
LongDRX-CycleStartOffset;
LongDTX-CycleStartOffset;
ShortDRX-Cycle;
ShortDTX-Cycle;
DrxShortCycleTimer; and
DtxShortCycleTimer.

An embodiment of the invention provides a second terminal for configuring communication, the second terminal including:

a first receiving module configured to receive configuration information for determining a target communication period of time from a first terminal, wherein the target communication period of time is a period of time in which direct communication interface transmission and/or reception can be performed via a direct communication interface; and a time-period determining module configured to determine the target communication period of time according to the configuration information.

Optionally the time-period determining module is further configured:

if the second terminal does not access a first network-side device, to transmit the configuration information to an accessed second network-side device.

An embodiment of the invention provides a first network-side device for configuring communication, the first network-side device including:

a second information determining module configured to determine configuration information for determining a target communication period of time, wherein the target communication period of time is a period of time in which direct communication interface transmission and/or reception can be performed via a direct communication interface; and a transmitting module configured to transmit the configuration information to a first terminal, so that the first determine determines the target communication period of time according to the configuration information, and notifies a second terminal of the configuration information.

Optionally the second information determining module is configured to determine the configuration information according to a part or all of the following parameters:
a traffic type of direct communication;
a traffic characteristic of direct communication;
SPS configuration of the first terminal and/or the second terminal; and
DRX and/or DTX configuration information for the first terminal and/or the second terminal over a Uu interface.

Optionally the second information determining module is further configured:

to determine the configuration information to be transmitted to the first terminal, according to received configuration information desirable to the first terminal.

Optionally if the parameters for determining the configuration information include DRX and/or DTX configuration information for the second terminal over a Uu interface, and the second terminal does not access the first network-side device, then the second information determining module is further configured:

to obtain the current DTX and/or DRX configuration of the second terminal over the Uu interface through a second network-side device accessed by the second terminal; or to obtain configuration information desirable to the second terminal through a second network-side device accessed by the second terminal.

Optionally the second information determining module is further configured:

to determine a resource for direct communication according to the configuration information; and/or to modify DRX and/or DTX configuration of the first terminal over a Uu interface according to the configuration information.

Optionally the configuration information includes a part or all of the following information:
onDurationTimer;
drx-InactivityTimer;
drx-RetransmissionTimer,
LongDRX-CycleStartOffset;
LongDTX-CycleStartOffset;
ShortDRX-Cycle;
ShortDTX-Cycle;
DrxShortCycleTimer; and
DtxShortCycleTimer.

An embodiment of the invention provides a second network-side device for configuring communication, the second network-side device including:

a second receiving module s configured to receive configuration information, for determining a target communication period of time, transmitted by a second terminal, wherein the target communication period of time is a period of time in which direct communication interface transmission and/or reception can be performed via a direct communication interface, and the configuration information is transmitted by a first terminal to the second terminal; and a processing module configured to determine a resource for direct communication according to the configuration information; and/or to modify DRX and/or DTX configuration of the second terminal over a Uu interface according to the configuration information.

An embodiment of the invention provides another first terminal for configuring communication, the first terminal including:

a processor configured to read and execute program in a memory:

to determine configuration information for determining a target communication period of time, wherein the target communication period of time is a period of time in which direct communication interface transmission and/or reception can be performed via a direct communication interface; and to determine the target communication period of time according to the configuration information, and to notify a second terminal of the configuration information via the direct communication interface through a transceiver.

Optionally the processor is configured to determine the configuration information according to a part or all of the following parameters:

a traffic type of direct communication;
a traffic characteristic of direct communication:
SPS configuration of the first terminal and/or the second terminal; and
DRX and/or DTX configuration information for the first terminal and/or the second terminal over a Uu interface.

Optionally the processor configured to determine the configuration information for determining the target communication period of time is configured to receive the configuration information from a first network-side device through the transceiver.

Optionally the processor is further configured:
to transmit desirable configuration information to the first network-side device, so that the first network-side device determines the configuration information to be transmitted to the first terminal, according to the received desirable configuration information.

Optionally the processor is further configured:
to notify the second terminal of the identifier of the first terminal, and the identifier of the second terminal together with the configuration information through the transceiver.

Optionally there is a uni-cast communication between the first terminal and the second terminal, and the identifier of the first terminal, and the identifier of the second terminal are layer-2 identifiers over the direct communication interface; or there is a broadcast communication between the first terminal and the second terminal, and the identifier of the first terminal, and the identifier of the second terminal is a layer-2 group identifier or a layer-2 broadcast identifier of a direct communication interface, Optionally the configuration information includes a part or all of the following information:
onDurationTimer;
drx-Inactivity Timer;
drx-RetransmissionTimer;
LongDRX-CycleStartOffset;
LongDTX-CycleStartOffset;
ShortDRX-Cycle;
ShortDTX-Cycle;
DrxShortCycleTimer; and
DtxShortCycleTimer.

An embodiment of the invention provides another second terminal for configuring communication, the second terminal including:
a processor configured to read and execute program in a memory:
to receive configuration information for determining a target communication period of time from a first terminal through a transceiver, wherein the target communication period of time is a period of time in which direct communication interface transmission and/or reception can be performed via a direct communication interface; and to determine the target communication period of time according to the configuration information.

Optionally the processor is further configured:
if the second terminal does not access a first network-side device, to transmit the configuration information to an accessed second network-side device.

An embodiment of the invention provides another first network-side device for configuring communication, the first network-side device including:
a processor configured to read and execute program in a memory:
to determine configuration information for determining a target communication period of time, wherein the target communication period of time is a period of time in which direct communication interface transmission and/or reception can be performed via a direct communication interface; and to transmit the configuration information to a first terminal through a transceiver, so that the first determine determines the target communication period of time according to the configuration information, and notifies a second terminal of the configuration information.

Optionally the processor is configured to determine the configuration information according to a part or all of the following parameters:
a traffic type of direct communication;
a traffic characteristic of direct communication;
SPS configuration of the first terminal and/or the second terminal; and
DRX and/or DTX configuration information for the first terminal and/or the second terminal over a Uu interface.

Optionally the processor is further configured:
to determine the configuration information to be transmitted to the first terminal, according to received configuration information desirable to the first terminal.

Optionally if the parameters for determining the configuration information include DRX and/or DTX configuration information for the second terminal over a Uu interface, and the second terminal does not access the first network-side device, then the processor is further configured:
to obtain the current DTX and/or DRX configuration of the second terminal over the Uu interface through a second network-side device accessed by the second terminal; or
to obtain configuration information desirable to the second terminal through a second network-side device accessed by the second terminal.

Optionally the processor is further configured:
to determine a resource for direct communication according to the configuration information; and/or
to modify DRX and/or DTX configuration of the first terminal over a Uu interface according to the configuration information.

Optionally the configuration information includes a part or all of the following information:
onDurationTimer;
drx-InactivityTimer;
drx-RetransmissionTimer;
LongDRX-CycleStartOffset;
LongDTX-CycleStartOffset;
ShortDRX-Cycle;
ShortDTX-Cycle;
DrxShortCycleTimer; and
DtxShortCycleTimer.

An embodiment of the invention provides another second network-side device for configuring communication, the second network-side device including:
a processor configured to read and execute program in a memory:

to receive configuration information, for determining a target communication period of time, transmitted by a second terminal through a transceiver, wherein the target communication period of time is a period of time in which direct communication interface transmission and/or reception can be performed via a direct communication interface, and the configuration information is transmitted by a first terminal to the second terminal; and to determine a resource for direct communication according to the configuration information; and/or to modify DRX and/or DTX configuration of the second terminal over a Uu interface according to the configuration information.

In the embodiments of the invention, the first terminal determines the configuration information for determining the target communication period of time, where the target communication period of time is a period of time in which direct communication interface transmission and/or reception can be performed via a direct communication interface; and the terminal determines the target communication period of time according to the configuration information, and notifies the second terminal of the configuration information via the direct communication interface, so that the terminals to communicate directly with each other determine the target communication period of time according to the configuration information, and perform direct communication interface transmission and/or reception in the target communication period of time, without listening constantly to any system broadcast or any preconfigured D2D receive resources, thus saving their power.

BRIEF DESCRIPTION OF THE DRAWINGS

In order to make the technical solutions according to the embodiments of the invention more apparent, the drawings to which reference is to be made in a description of the embodiments will be introduced below in brief, and apparently the drawings to be described below are only a part of the embodiments of the invention. Those ordinarily skilled in the art can further derive from these drawings other drawings without any inventive effort.

DETAILED DESCRIPTION OF THE EMBODIMENTS

In the embodiments of the invention, a first terminal determines configuration information for determining a target communication period of time, where the target communication period of time is a period of time in which direct communication interface transmission and/or reception can be performed via a direct communication interface and the terminal determines the target communication period of time according to the configuration information, and notifies a second terminal of the configuration information via the direct communication interface, so that the terminals to communicate directly with each other determine the target communication period of time according to the configuration information, and perform direct communication interface transmission and/or reception in the target communication period of time, without listening constantly to any system broadcast or any preconfigured D2D receive resources, thus saving their power.

In order to make the objects, technical solutions, and advantages of the invention more apparent, the invention will be described below in further details with reference to the drawings, and apparently the embodiments described below are only a part but not all of the embodiments of the invention. Based upon the embodiments here of the invention, all the other embodiments which can occur to those skilled in the art without any inventive effort shall fall into the scope of the invention.

Figure 1:
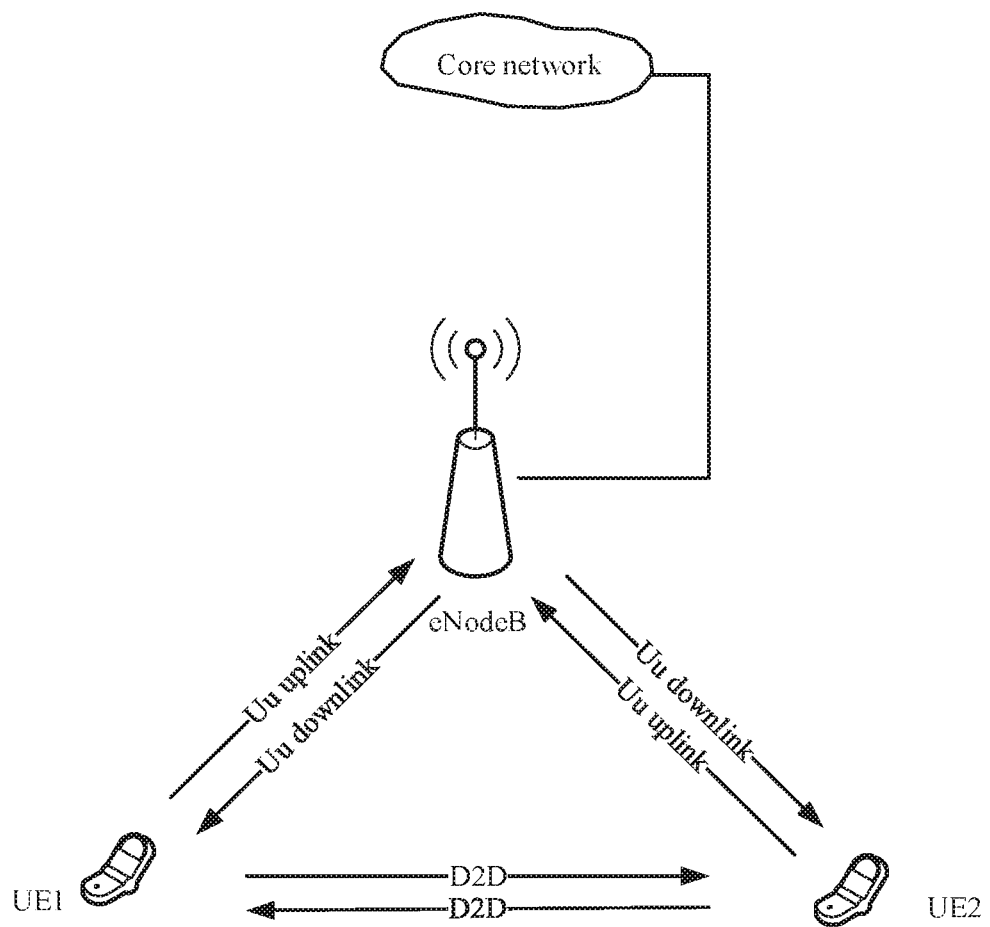
FIG. 1 is a schematic diagram of D2D communication in the related art.
Figure 2:
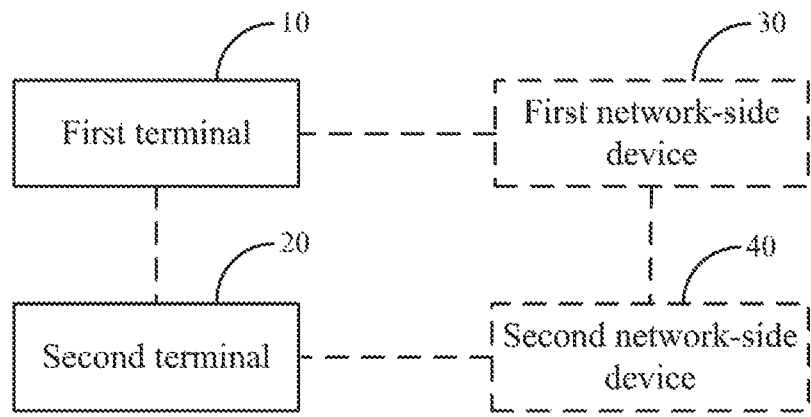
FIG. 2 is a schematic structural diagram of a system for configuring communication according to an embodiment of the invention.

As illustrated in FIG. 2, a system for configuring communication according to an embodiment of the invention includes followings.

A first terminal 10 is configured to determine configuration information for determining a target communication period of time, where the target communication period of time is a period of time in which direct communication interface transmission and/or reception can be performed via a direct communication interface; and to determine the target communication period of time according to the configuration information, and to notify a second terminal of the configuration information via the direct communication interface, so that the second terminal determines the target communication period of time according to the configuration information.

The second terminal 20 is configured to receive the configuration information, for determining the target communication period of time, from the first terminal, where the target communication period of time is a period of time in which direct communication interface transmission and/or reception can be performed via a direct communication interface; and to determine the target communication period of time according to the configuration information.

The first terminal and the second terminal are two terminals which can communicate directly with each other.

If the first terminal is a transmitting terminal in direct communication, then the second terminal will be a receiving terminal in direct communication.

If the first terminal is a receiving terminal in direct communication, then the second terminal will be a transmitting terminal in direct communication.

In the embodiment of the invention, the first terminal can determine the configuration information for determining the target communication period of time in one of the following implementations without being limited thereto.

1. The first terminal determines directly the configuration information for determining the target communication period of time.

2. The first terminal determines desirable configuration information for determining the target communication period of time, and a network-side device determines the configuration information according to the configuration information for determining the target communication period of time desirable to the terminal, and transmits the configuration information to the first terminal.

3. The network-side device determines directly the configuration information for determining the target communication period of time, and transmits the configuration information to the first terminal.

In the second and third implementations, the system according to the embodiment of the invention further includes followings.

A first network-side device 30 is configured to determine the configuration information for determining the target communication period of time, and to transmit the configuration information to the first terminal, so that the first terminal determines the target communication period of time according to the configuration information, and notifies the second terminal of the configuration information.

The respective implementations above will be introduced below respectively.

In the first implementation, the first terminal determines directly the configuration information for determining the target communication period of time.

Optionally, the first terminal determines the configuration information according to a part or all of the following parameters, a traffic type of direct communication, e.g., Voice over Internet Protocol (VoIP) traffic, Vehicle to Things (V2X) traffic, etc;

a service characteristic of direct communication, e.g., the periodicity of periodical traffic;

Semi-Persistent Scheduling (SPS) configuration of the first terminal and/or the second terminal, for example, including a periodicity, a Cell-Radio Network Temporary Identifier (C-RNTI), etc; and Discontinuous Reception (DRX) and/or Discontinuous Transmission (DTX) configuration information for the first terminal and/or the second terminal over a Uu interface, For example, the first terminal can determine the configuration information so that the configuration information matches as much as possible with configuration information for the first terminal to determine a communication period of time over the Uu interface, for example, is aligned with DRX onduration (a DTX timer).

Of course, the configuration information can alternatively be determined according to configuration information for the first terminal to determine a communication period of time over the Uu interface, and configuration information for the second terminal to determine a communication period of time over the Uu interface (for example, notified by a serving base station of the second terminal to the first network-side device, and then notified by the first network-side device to the first terminal).

In another example, the first terminal can further determine the configuration information so that the configuration information matches with an SPS configuration periodicity of the first terminal over the Uu interface, so an SPS activation instance of time of the first terminal matches with the communication period of time determined by the first terminal according to the configuration information.

Optionally, the first terminal can further transmit the configuration information to the second terminal by notifying the second terminal of the identifier of the first terminal, and the identifier of the second terminal together with the configuration information.

In an implementation, if there is uni-cast communication between the first terminal and the second terminal, then the identifier of the first terminal, and the identifier of the second terminal will be layer-2 identifiers over the direct communication interface; or, if there is broadcast communication between the first terminal and the second terminal, then the identifier of the first terminal, and the identifier of the second terminal will be a layer-2 group identifier or a layer-2 broadcast identifier of a direct communication interface.

Optionally, the first terminal can further transmit the determined configuration information to the accessed first network-side device, so that the first network-side device can determine a resource for direct communication according to the received configuration information; and/or modify the DRY and/or DTX configuration of the first terminal over the Uu interface according to the received configuration information, for example, so that a communication period of time available over the Uu interface matches with a communication period of time over a direct communication interface (e.g., a D2D interface).

In the second implementation, the first terminal determines desirable configuration information for determining the target communication period of time, and a network-side device determines the configuration information according to the configuration information for determining the target communication period of time desirable to the terminal, and transmits the configuration information to the first terminal.

Particularly, the first terminal transmits the desirable configuration information to the first network-side device.

Correspondingly, the network-side device determines the configuration information to be transmitted to the first terminal, according to the received configuration information desirable to the first terminal.

The first terminal determines the desirable configuration information according to a part or all of the following parameters:

a traffic type of direct communication;

a traffic characteristic of direct communication;

SPS configuration of the first terminal and/or the second terminal; and

DRX and/or DTX configuration information for the first terminal and/or the second terminal over a Uu interface.

The first network-side device determining the configuration information to be transmitted to the first terminal, according to the received configuration information desirable to the first terminal can alternatively determine the configuration information to be transmitted to the first terminal, according to a part or all of the parameters above, and the configuration information desirable to the first terminal.

Optionally, the first terminal can further transmit the configuration information to the second terminal by notifying the second terminal of the identifier of the first terminal, and the identifier of the second terminal together with the configuration information.

In an implementation, if there is uni-cast communication between the first terminal and the second terminal, then the identifier of the first terminal, and the identifier of the second terminal will be layer-2 identifiers over the direct communication interface; or, if there is broadcast communication between the first terminal and the second terminal, then the identifier of the first terminal, and the identifier of the second terminal will be a layer-2 group identifier or a layer-2 broadcast identifier of a direct communication interface.

Optionally, the first network-side device determines a resource for direct communication according to the configuration information; and/or the first network-side device modifies the DRX and/or DTX configuration of the first terminal over a Uu interface according to the configuration information.

In the third implementation, the network-side device determines directly the configuration information for determining the target communication period of time, and transmits the configuration information to the first terminal.

Optionally, the first network-side device determines the configuration information according to a part or all of the following parameters:

a traffic type of direct communication;
a traffic characteristic of direct communication;
SPS configuration of the first terminal and/or the second terminal; and
DRX and/or DTX configuration information for the first terminal and/or the second terminal over a Uu interface.

For example, the first network-side device can determine the configuration information so that the configuration information matches as much as possible with configuration information for the first terminal to determine a communication period of time over the Uu interface, for example, is aligned with DRX onduration (a DTX timer).

Of course, the configuration information can alternatively be determined according to configuration information for the first terminal to determine a communication period of time over the Uu interface, and configuration information for the second terminal to determine a communication period of time over the Uu interface (for example, notified by a serving base station of the second terminal to the first network-side device, and then notified by the first network-side device to the first terminal).

In another example, the first network-side device can further determine the configuration information so that the configuration information matches with an SPS configuration periodicity of the first terminal over the Uu interface, so an SPS activation instance of time of the first terminal matches with the communication period of time determined by the first terminal according to the configuration information.

Optionally, the first terminal can further transmit the configuration information to the second terminal by notifying the second terminal of the identifier of the first terminal, and the identifier of the second terminal together with the configuration information.

In an implementation, if there is uni-cast communication between the first terminal and the second terminal, then the identifier of the first terminal, and the identifier of the second terminal will be layer-2 identifiers over the direct communication interface; or, if there is broadcast communication between the first terminal and the second terminal, then the identifier of the first terminal, and the identifier of the second terminal will be a layer-2 group identifier or a layer-2 broadcast identifier of a direct communication interface.

Optionally, the first network-side device determines a resource for direct communication according to the configuration information; and/or the first network-side device modifies the DRX and/or DTX configuration of the first terminal over a Uu interface according to the configuration information.

It shall be noted that the three implementations above are only exemplary, but any other implementations in which the configuration information for determining the target communication period of time can be determined will be applicable to the embodiment of the invention.

In an implementation, the first terminal and the second terminal may access different network-side devices, and if the first terminal accesses the first network-side device, and the second terminal does not access the first network-side device, then the second terminal may transmit the received configuration information transmitted by the first terminal to an accessed second network-side device.

Correspondingly the system according to the embodiment of the invention further includes followings.

A second network-side device 40 is configured to receive the configuration information for determining the target communication period of time, where the target communication period of time is a period of time in which direct communication interface transmission and/or reception can be performed via a direct communication interface, and the configuration information is transmitted by the first terminal to the second terminal; and to determine a resource for direct communication according to the configuration information; and/or to modify DRX and/or DTX configuration of the second terminal over a Uu interface according to the configuration information.

In the second and third implementations above, if the second terminal does not access the first network-side device, then optionally the first network-side device and the second network-side device may negotiate with each other about the configuration information, Particularly, the first network-side device obtains the current DTX and/or DRX configuration of the second terminal over the Uu interface through the second network-side device accessed by the second terminal; or, the first network-side device obtains the configuration information desirable to the second terminal through the second network-side device accessed by the second terminal.

The first network-side device obtains the information above to thereby enable the determined communication period of time to match with the DTX and/or DRX configuration of the two terminals over the Uu interface.

Since the configuration information desirable to a terminal (the first terminal and/or the second terminal) also matches with the DTX and/or DRX configuration over the Uu interface, the configuration information to be obtained by the first network-side device can also enable the determined communication period of time to match with the DTX and/or DRX configuration of the two terminals over the Uu interface.

Optionally, the configuration information determined by the first terminal or the first network-side device can include but will not be limited to a part or all of the following information:
onDurationTimer;
drx-InactivityTimer;
drx-RetransmissionTimer:
LongDRX-CycleStartOffset;
LongDTX-CycleStartOffset;
ShortDRX-Cycle;
ShortDTX-Cycle;
DrxShortCycleTimer; and
DtxShortCycleTimer.

Here the network-side device according to the embodiment of the invention can be a base station (e.g., a macro base station, a home base station, etc.), or can be a Relay Node (RN) device, or can be another network-side device.

Figure 3:
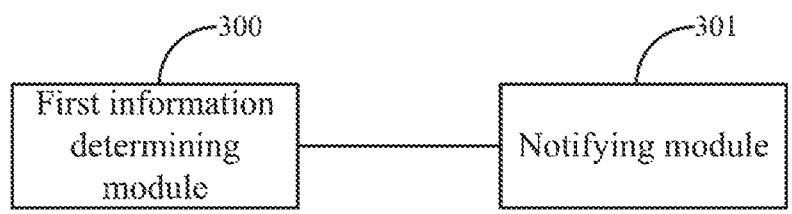
FIG. 3 is a schematic structural diagram of a first terminal according to an embodiment of the invention.

As illustrated in FIG. 3, a first terminal according to an embodiment of the invention includes followings.

A first information determining module 300 is configured to determine configuration information for determining a target communication period of time, where the target communication period of time is a period of time in which direct communication interface transmission and/or reception can be performed via a direct communication interface.

A notifying module 301 is configured to determine the target communication period of time according to the configuration information, and to notify a second terminal of the configuration information via the direct communication interface, so that the second terminal determines the target communication period of time according to the configuration information.

Optionally, the first information determining module 300 is configured to determine the configuration information according to a part or all of the following parameters:
a traffic type of direct communication;
a traffic characteristic of direct communication;
SPS configuration of the first terminal and/or the second terminal; and
DRX and/or DTX configuration information for the first terminal and/or the second terminal over a Uu interface.

Optionally, the first information determining module 300 is configured to receive the configuration information from a first network-side device.

Optionally, the first information determining module 300 is further configured:
to transmit desirable configuration information to the first network-side device, so that the first network-side device determines the configuration information to be transmitted to the first terminal, according to the received desirable configuration information.

Optionally, the notifying module 301 is further configured to notify the second terminal of the identifier of the first terminal, and the identifier of the second terminal together with the configuration information.

Optionally, there is uni-cast communication between the first terminal and the second terminal, and the identifier of the first terminal, and the identifier of the second terminal are layer-2 identifiers over the direct communication interface; or, there is broadcast communication between the first terminal and the second terminal, and the identifier of the first terminal, and the identifier of the second terminal is a layer-2 group identifier or a layer-2 broadcast identifier of a direct communication interface.

Optionally, the configuration information includes a part or all of the following information:
onDurationTimer;
drx-InactivityTimer;
drx-RetransmissionTimer;
LongDRX-CycleStartOffset;
LongDTX-CycleStartOffset;
ShortDRX-Cycle;
ShortDTX-Cycle;
DrxShortCycleTimer; and
DtxShortCycleTimer.

Figure 4:
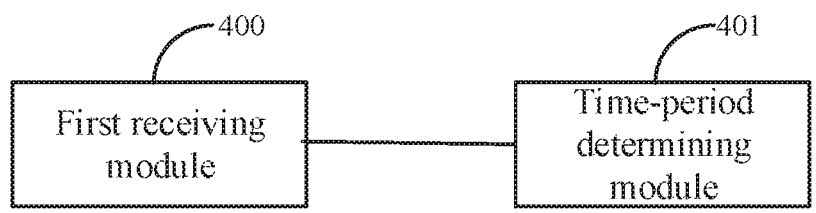
FIG. 4 is a schematic structural diagram of a second terminal according to an embodiment of the invention.

As illustrated in FIG. 4, a second terminal according to an embodiment of the invention includes followings.

A first receiving module 400 is configured to receive configuration information for determining a target communication period of time from a first terminal, where the target communication period of time is a period of time in which direct communication interface transmission and/or reception can be performed via a direct communication interface.

A time-period determining module 401 is configured to determine the target communication period of time according to the configuration information.

Optionally, the time-period determining module 401 is further configured:
if the second terminal does not access a first network-side device, to transmit the configuration information to an accessed second network-side device.

Figure 5:
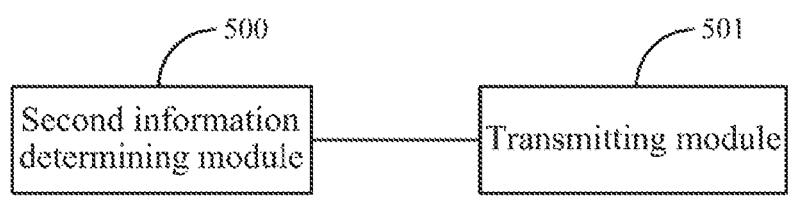
FIG. 5 is a schematic structural diagram of a first network-side device according to an embodiment of the invention.

As illustrated in FIG. 5, a first network-side device according to an embodiment of the invention includes followings.

A second information determining module 500 is configured to determine configuration information for determining a target communication period of time, where the target communication period of time is a period of time in which direct communication interface transmission and/or reception can be performed via a direct communication interface.

A transmitting module 501 is configured to transmit the configuration information to a first terminal, so that the first determine determines the target communication period of time according to the configuration information, and notifies a second terminal of the configuration information.

Optionally, the second information determining module 500 is configured to determine the configuration information according to a part or all of the following parameters:
a traffic type of direct communication;
a traffic characteristic of direct communication:
SPS configuration of the first terminal and/or the second terminal; and
DRX and/or DTX configuration information for the first terminal and/or the second terminal over a Uu interface.

Optionally, the second information determining module 500 is further configured to determine the configuration information to be transmitted to the first terminal, according to received configuration information desirable to the first terminal.

Optionally, if the parameters for determining the configuration information include DRX and/or DTX configuration information for the second terminal over a Uu interface, and the second terminal does not access the first network-side device, then the second information determining module 500 is further configured:
to obtain the current DTX and/or DRX configuration of the second terminal over the Uu interface through a second network-side device accessed by the second terminal; or
to obtain configuration information desirable to the second terminal through a second network-side device accessed by the second terminal.

Optionally, the second information determining module 500 is further configured:

to determine a resource for direct communication according to the configuration information; and/or to modify DRX and/or DTX configuration of the first terminal over a Uu interface according to the configuration information.

Optionally, the configuration information includes a part or all of the following information:
onDurationTimer;
drx-InactivityTimer;
drx-RetransmissionTimer;
LongDRX-CycleStartOffset;
LongDTX-CycleStartOffset;
ShortDRX-Cycle;
ShortDTX-Cycle;
DrxShortCycleTimer; and
DtxShortCycleTimer.

Figure 6:
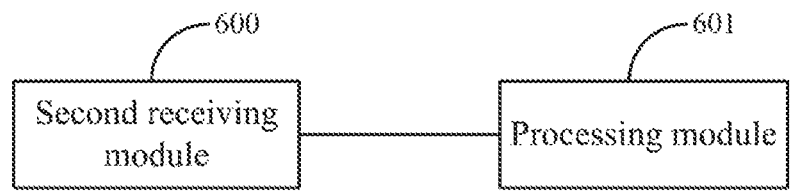
FIG. 6 is a schematic structural diagram of a second network-side device according to an embodiment of the invention.

As illustrated in FIG. 6, a second network-side device according to an embodiment of the invention includes followings.

A second receiving module 600 is configured to receive configuration information, for determining a target communication period of time, transmitted by a second terminal, where the target communication period of time is a period of time in which direct communication interface transmission and/or reception can be performed via a direct communication interface, and the configuration information is transmitted by a first terminal to the second terminal.

A processing module 601 is configured to determine a resource for direct communication according to the configuration information; and/or to modify DRX and/or DTX configuration of the second terminal over a Uu interface according to the configuration information.

Figure 7:
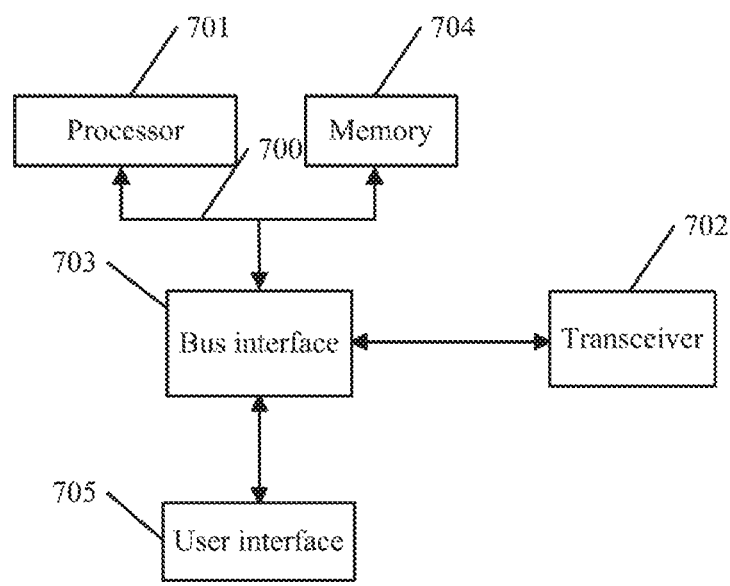
FIG. 7 is a schematic structural diagram of another first terminal according to an embodiment of the invention.

As illustrated in FIG. 7, another first terminal according to an embodiment of the invention includes followings.

A processor 701 is configured to read and execute program in a memory 704:

to determine configuration information for determining a target communication period of time, where the target communication period of time is a period of time in which direct communication interface transmission and/or reception can be performed via a direct communication interface; and to determine the target communication period of time according to the configuration information, and to notify a second terminal of the configuration information via the direct communication interface through a transceiver 702, so that the second terminal determines the target communication period of time according to the configuration information.

The transceiver 702 is configured to receive and transmit data under the control of the processor 701.

Optionally, the processor 701 is configured to determine the configuration information according to a part or all of the following parameters:
a traffic type of direct communication;
a traffic characteristic of direct communication;
SPS configuration of the first terminal and/or the second terminal; and
DRX and/or DTX configuration information for the first terminal and/or the second terminal over a Uu interface.

Optionally, the processor 701 is configured to determine the configuration information for determining the target communication period of time by receiving the configuration information from a first network-side device through the transceiver 702.

Optionally, the processor 701 is further configured to transmit desirable configuration information to the first network-side device, so that the first network-side device determines the configuration information to be transmitted to the first terminal, according to the received desirable configuration information.

Optionally, the processor 701 is further configured to notify the second terminal of the identifier of the first terminal, and the identifier of the second terminal together with the configuration information through the transceiver 702.

Optionally, there is uni-cast communication between the first terminal and the second terminal, and the identifier of the first terminal, and the identifier of the second terminal are layer-2 identifiers over the direct communication interface; or, there is broadcast communication between the first terminal and the second terminal, and the identifier of the first terminal, and the identifier of the second terminal is a layer-2 group identifier or a layer-2 broadcast identifier of a direct communication interface.

Optionally, the configuration information includes a part or all of the following information:
onDurationTimer;
drx-InactivityTimer;
drx-RetransmissionTimer;
LongDRX-CycleStartOffset;
LongDTX-CycleStartOffset;
ShortDRX-Cycle;
ShortDTX-Cycle;
DrxShortCycleTimer; and
DtxShortCycleTimer.

In FIG. 7, in the bus architecture (represented as a bus 700), the bus 700 can include any number of interconnecting buses and bridges to particularly link together various circuits including one or more processors represented by the processor 701, and one or more memories represented by the memory 704. The bus 700 can further link together various other circuits, e.g., a peripheral device, a manostat, a power management circuit, etc., all of which are well known in the art, so a further description thereof will be omitted in this context. A bus interface 703 serves as an interface between the bus 700 and the transceiver 702. The transceiver 702 can be an element, or a number of elements, e.g., a plurality of receivers and transmitters, which are units for communication with various other devices over a transmission medium. For example, the transceiver 702 receives external data from another device. The transceiver 702 is configured to transmit data processed by the processor 701 to the other device. A user interface 705, e.g., a keypad, a display, a loudspeaker, a microphone, a joystick, etc., can be further provided dependent upon the nature of a computing system.

The processor 701 is responsible for managing the bus 700 and performing normal processes, e.g., running a general operating system. The memory 704 can be configured to store data for use by the processor 701 in performing operations.

Figure 8:
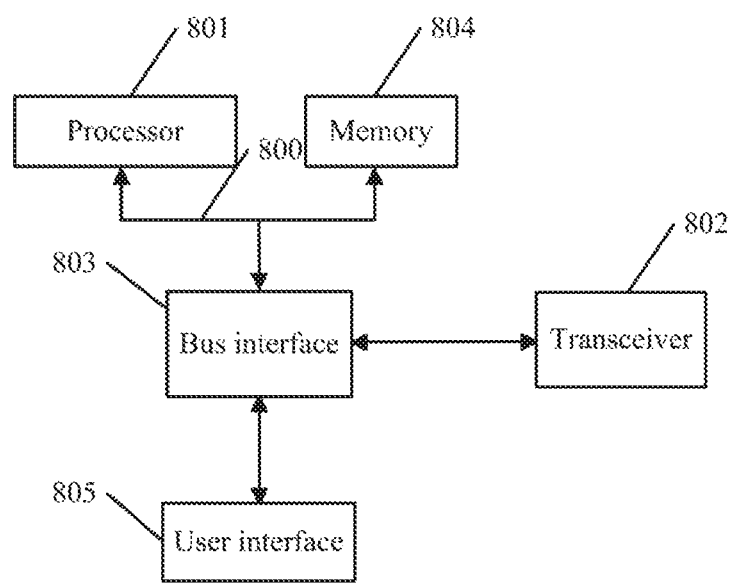
FIG. 8 is a schematic structural diagram of another second terminal according to an embodiment of the invention.

Optionally, the processor 701 can be a Central Processing Unit (CPU), an Application Specific Integrated Circuit (ASIC), a Field-Programmable Gate Array (FPGA), or a Complex Programmable Logic Device (CPLD), As illustrated in FIG. 8, another second terminal according to an embodiment of the invention includes followings.

A processor 801 is configured to read and execute program in a memory 804:

to receive configuration information for determining a target communication period of time from a first terminal through a transceiver 802, where the target communication period of time is a period of time in which direct communication interface transmission and/or reception can be performed via a direct communication interface; and to determine the target communication period of time according to the configuration information.

The transceiver 802 is configured to receive and transmit data under the control of processor 801.

Optionally, the processor 801 is further configured:

if the second terminal does not access a first network-side device, to transmit the configuration information to an accessed second network-side device.

In FIG. 8, in the bus architecture (represented as a bus 800), the bus 800 can include any number of interconnecting buses and bridges to particularly link together various circuits including one or more processors represented by the processor 801, and one or more memories represented by the memory 804. The bus 800 can further link together various other circuits, e.g., a peripheral device, a manostat, a power management circuit, etc., all of which are well known in the art, so a further description thereof will be omitted in this context. A bus interface 803 serves as an interface between the bus 700 and the transceiver 802. The transceiver 802 can be an element, or a number of elements, e.g., a plurality of receivers and transmitters, which are units for communication with various other devices over a transmission medium. For example, the transceiver 802 receives external data from another device. The transceiver 802 is configured to transmit data processed by the processor 801 to the other device. A user interface 805, e.g., a keypad, a display, a loudspeaker, a microphone, a joystick, etc., can be further provided dependent upon the nature of a computing system.

The processor 801 is responsible for managing the bus 800 and performing normal processes, e.g., running a general operating system. The memory 804 can be configured to store data for use by the processor 801 in performing operations.

Optionally, the processor 801 can be a CPU, an ASIC, an FPGA, or a CPLD.

Figure 9:
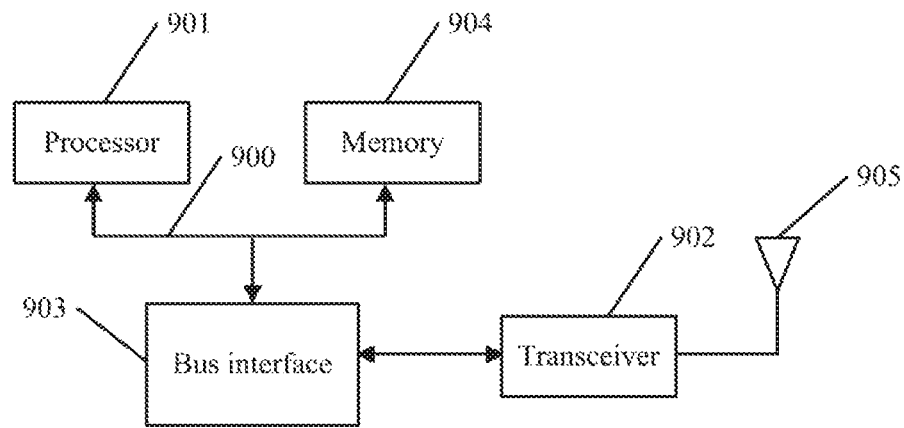
FIG. 9 is a schematic structural diagram of another first network-side device according to an embodiment of the invention.

As illustrated in FIG. 9, another first network-side device according to an embodiment of the invention includes followings.

A processor 901 is configured to read and execute program in a memory 904:

to determine configuration information for determining a target communication period of time, where the target communication period of time is a period of time in which direct communication interface transmission and/or reception can be performed via a direct communication interface; and to transmit the configuration information to a first terminal through a transceiver 902, so that the first determine determines the target communication period of time according to the configuration information, and notifies a second terminal of the configuration information.

The transceiver 902 is configured to receive and transmit data wider the control of the processor 901.

Optionally, the processor 901 is configured to determine the configuration information according to a part or all of the following parameters:

a traffic type of direct communication;
a traffic characteristic of direct communication;
SPS configuration of the first terminal and/or the second terminal; and
DRX and/or DTX configuration information for the first terminal and/or the second terminal over a Uu interface.

Optionally, the processor 901 is further configured to determine the configuration information to be transmitted to the first terminal, according to received configuration information desirable to the first terminal.

Optionally, if the parameters for determining the configuration information include DRX and/or DTX configuration information for the second terminal over a Uu interface, and the second terminal does not access the first network-side device, then the processor 901 is further configured:

to obtain the current DTX and/or DRX configuration of the second terminal over the Uu interface through a second network-side device accessed by the second terminal; or, to obtain configuration information desirable to the second terminal through a second network-side device accessed by the second terminal.

Optionally, the processor 901 is further configured:

to determine a resource for direct communication according to the configuration information; and/or to modify DRX and/or DTX configuration of the first terminal over a Uu interface according to the configuration information.

Optionally, the configuration information includes a part or all of the following information:

onDurationTimer;
drx-InactivityTimer;
drx-RetransmissionTimer;
LongDRX-CycleStartOffset;
LongDTX-CycleStartOffset;
ShortDRX-Cycle;
ShortDTX-Cycle;
DrxShortCycleTimer; and
DtxShortCycleTimer.

In FIG. 9, the bus architecture (represented as a bus 900), the bus 900 can include any number of interconnecting buses and bridges to particularly link together various circuits including one or more processors represented by the processor 901, and one or more memories represented by the memory 904. The bus 900 can further link together various other circuits, e.g., a peripheral device, a manostat, a power management circuit, etc., all of which are well known in the art, so a further description thereof will be omitted in this context. A bus interface 903 serves as an interface between the bus 700 and the transceiver 902. The transceiver 902 can be an element, or a number of elements, e.g., a plurality of receivers and transmitters, which are units for communication with various other devices over a transmission medium. Data processed by the processor 901 are transmitted a wireless medium through an antenna 905, and furthermore the antenna 905 receives and transports data to the processor 901.

The processor 901 is responsible for managing the bus 900 and performing normal processes, and can further provide various functions, e.g., timing, a peripheral interface, voltage regulation, power source management, and other control functions. The memory 904 can be configured to store data for use by the processor 901 in performing operations.

Optionally, the processor 901 can be a CPU, an ASIC, an FPGA, or a CPLD.

Figure 10:
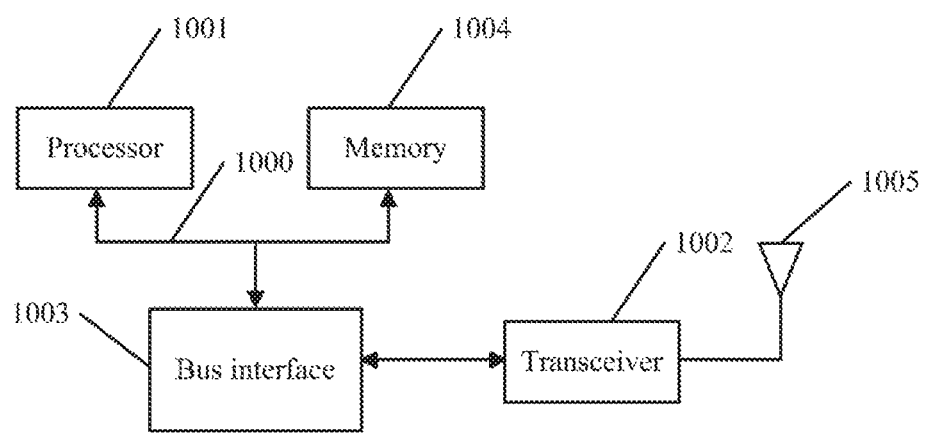
FIG. 10 is a schematic structural diagram of another second network-side device according to an embodiment of the invention.

As illustrated in FIG. 10, another second network-side device according to an embodiment of the invention includes followings.

A processor 1001 is configured to read and execute program in a memory 1004:

to receive configuration information, for determining a target communication period of time, transmitted by a second terminal through a transceiver 1002, where the target communication period of time is a period of time in which direct communication interface transmission and/or reception can be performed via a direct communication interface, and the configuration information is transmitted by a first terminal to the second terminal; and to determine a resource for direct communication according to the configuration information; and/or to modify DRX and/or DTX configuration of the second terminal over a Uu interface according to the configuration information.

The transceiver 1002 is configured to receive and transmit data under the control of the processor 1001.

In FIG. 10, the bus architecture (represented as a bus 1000), the bus 1000 can include any number of interconnecting buses and bridges to particularly link together various circuits including one or more processors represented by the processor 1001, and one or more memories represented by the memory 1004. The bus 1000 can further link together various other circuits, e.g., a peripheral device, a manostat, a power management circuit, etc., all of which are well known in the art, so a further description thereof will be omitted in this context. A bus interface 1003 serves as an interface between the bus 700 and the transceiver 1002. The transceiver 1002 can be an element, or a number of elements, e.g., a plurality of receivers and transmitters, which are units for communication with various other devices over a transmission medium. Data processed by the processor 1001 are transmitted a wireless medium through an antenna 1005, and furthermore the antenna 1005 receives and transports data to the processor 1001.

The processor 1001 is responsible for managing the bus 1000 and performing normal processes, and can further provide various functions, e.g., tinting, a peripheral interface, voltage regulation, power source management, and other control functions. The memory 1004 can be configured to store data for use by the processor 1001 in performing operations.

Optionally, the processor 1001 can be a CPU, an ASIC, an FPGA, or a CPLD.

Based upon the same inventive idea, an embodiment of the invention further provides a method for configuring communication, and since a device corresponding to the method is the first terminal in the system for configuring communication according to the embodiment of the invention, and this method addresses the problem under a similar principle to the device, reference can be made to the implementation of the method for an implementation of the device, and a repeated description thereof will be omitted here.

Figure 11:
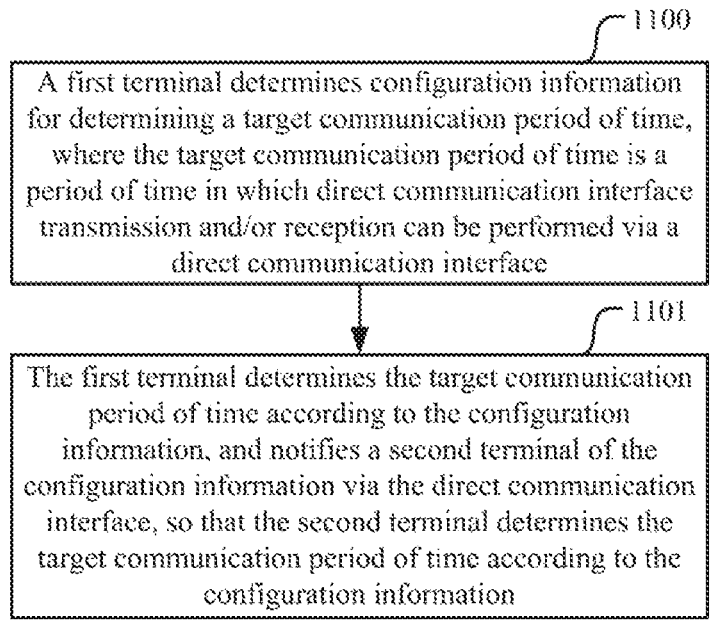
FIG. 11 is a schematic flow chart of a first method for configuring communication according to an embodiment of the invention.

As illustrated in FIG. 11, a first method for configuring communication according to an embodiment of the invention includes followings.

In the step 1100, a first terminal determines configuration information for determining a target communication period of time, where the target communication period of time is a period of time in which direct communication interface transmission and/or reception can be performed via a direct communication interface.

In the step 1101, the first terminal determines the target communication period of time according to the configuration information, and notifies a second terminal of the configuration information via the direct communication interface, so that the second terminal determines the target communication period of time according to the configuration information.

Optionally, the first terminal determines the configuration information for determining the target communication period of time as follows:

the first terminal determines the configuration information according to a part or all of the following parameters:
　　a traffic type of direct communication;
　　a traffic characteristic of direct communication;
　　SPS configuration of the first terminal and/or the second terminal; and
　　DRX and/or DTX configuration information for the first terminal and/or the second terminal over a Uu interface.

Optionally, the first terminal determines the configuration information for determining the target communication period of time as follows:

the first terminal receives the configuration information from a first network-side device.

Optionally, before the first terminal receives the configuration information from the first network-side device, the method further includes:

the first terminal transmits desirable configuration information to the first network-side device, so that the first network-side device determines the configuration information to be transmitted to the first terminal, according to the received desirable configuration information.

Optionally, the first terminal further notifies the second terminal of the configuration information via the direct communication interface as follows:

the first terminal notifies the second terminal of the identifier of the first terminal, and the identifier of the second terminal together with the configuration information.

Optionally, there is uni-cast communication between the first terminal and the second terminal, and the identifier of the first terminal, and the identifier of the second terminal are layer-2 identifiers over the direct communication interface; or, there is broadcast communication between the first terminal and the second terminal, and the identifier of the first terminal, and the identifier of the second terminal is a layer-2 group identifier or a layer-2 broadcast identifier of a direct communication interface.

Optionally, the configuration information includes a part or all of the following information:
　　onDurationTimer;
　　drx-InactivityTimer;
　　drx-RetransmissionTimer;
　　LongDRX-CycleStartOffset;
　　LongDTX-CycleStartOffset;
　　ShortDRX-Cycle;
　　ShortDTX-Cycle;
　　DrxShortCycleTimer; and
　　DtxShortCycleTimer.

Based upon the same inventive idea, an embodiment of the invention further provides a method for configuring communication, and since a device corresponding to the method is the second terminal in the system for configuring communication according to the embodiment of the invention, and this method addresses the problem under a similar principle to the device, reference can be made to the implementation of the method for an implementation of the device, and a repeated description thereof will be omitted here.

Figure 12:
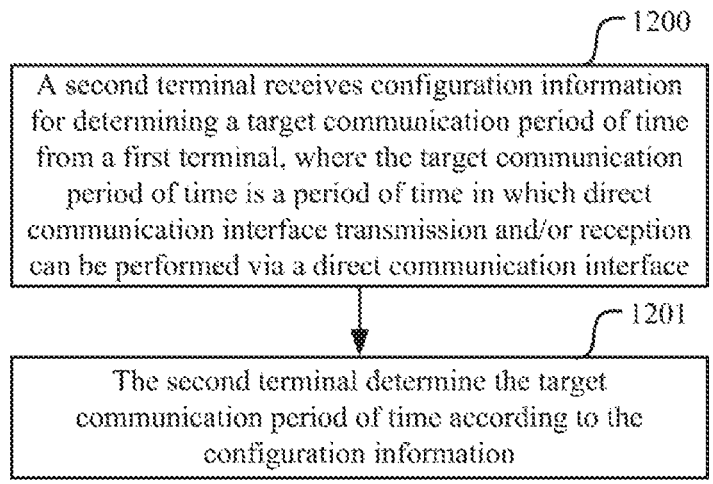
FIG. 12 is a schematic flow chart of a second method for configuring communication according to an embodiment of the invention.

As illustrated in FIG. 12, a second method for configuring communication according to an embodiment of the invention includes followings.

In the step 1200, a second terminal receives configuration information for determining a target communication period of time from a first terminal, where the target communication period of time is a period of time in which direct communication interface transmission and/or reception can be performed via a direct communication interface.

In the step 1201, the second terminal determine the target communication period of time according to the configuration information.

Optionally, after the second terminal receives the configuration information for determining the target communication period of time from the first terminal, the method further includes:

if the second terminal does not access a first network-side device, then the second terminal will transmit the configuration information to an accessed second network-side device.

Based upon the same inventive idea, an embodiment of the invention further provides a method for configuring communication, and since a device corresponding to the method is the first network-side device in the system for configuring communication according to the embodiment of the invention, and this method addresses the problem under a similar principle to the device, reference can be made to the implementation of the method for an implementation of the device, and a repeated description thereof will be omitted here.

Figure 13:
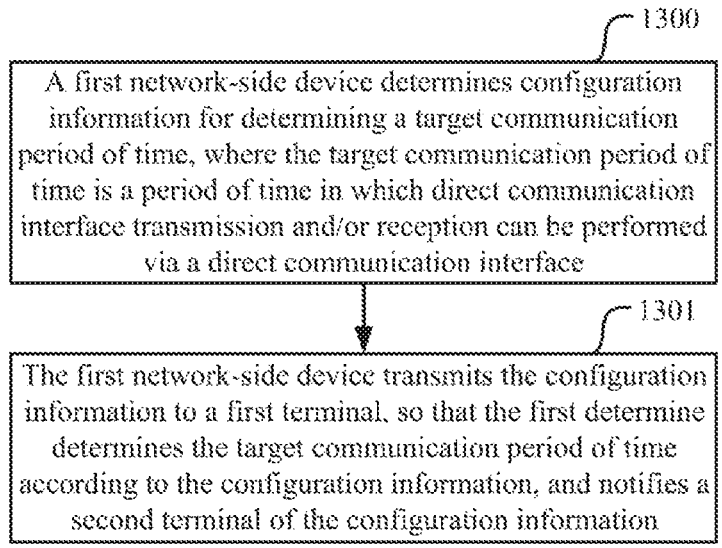
FIG. 13 is a schematic flow chart of a third method for configuring communication according to an embodiment of the invention.

As illustrated in FIG. 13, a third method for configuring communication according to an embodiment of the invention includes followings.

In the step 1300, a first network-side device determines configuration information for determining a target communication period of time, where the target communication period of time is a period of time in which direct communication interface transmission and/or reception can be performed via a direct communication interface.

In the step 1301, the first network-side device transmits the configuration information to a first terminal, so that the first determine determines the target communication period of time according to the configuration information, and notifies a second terminal of the configuration information.

Optionally, the first network-side device determines the configuration information for determining the target communication period of time as follows:

the first network-side device determines the configuration information according to a part or all of the following parameters:

a traffic type of direct communication;

a traffic characteristic of direct communication;

SPS configuration of the first terminal and/or the second terminal; and

DRX and/or DTX configuration information for the first terminal and/or the second terminal over a Uu interface.

Optionally, the first network-side device further determines the configuration information for determining the target communication period of time as follows.

The first network-side device determines the configuration information to be transmitted to the first terminal, according to received configuration information desirable to the first terminal.

Optionally, if the parameters for determining the configuration information include DRX and/or DTX configuration information for the second terminal over a Uu interface, and the second terminal does not access the first network-side device, then before the first network-side device determines the configuration information for determining the target communication period of time, the method further includes:

the first network-side device obtains the current DTX and/or DRX configuration of the second terminal over the Uu interface through a second network-side device accessed by the second terminal; or, the first network-side device obtains configuration information desirable to the second terminal through a second network-side device accessed by the second terminal.

Optionally, after the first network-side device determines the configuration information for determining the target communication period of time, the method further includes:

the first network-side device determines a resource for direct communication according to the configuration information; and/or the first network-side device modifies DRX and/or DTX configuration of the first terminal over a Uu interface according to the configuration information.

Optionally, the configuration information includes a part or all of the following information:

onDurationTimer;

drx-InactivityTimer;

drx-RetransmissionTimer;

LongDRX-CycleStartOffset;

LongDTX-CycleStartOffset;

ShortDRX-Cycle;

ShortDTX-Cycle;

DrxShortCycleTimer; and

DtxShortCycleTimer.

Based upon the same inventive idea, an embodiment of the invention further provides a method for configuring communication, and since a device corresponding to the method is the second network-side device in the system for configuring communication according to the embodiment of the invention, and this method addresses the problem under a similar principle to the device, reference can be made to the implementation of the method for an implementation of the device, and a repeated description thereof will be omitted here.

Figure 14:
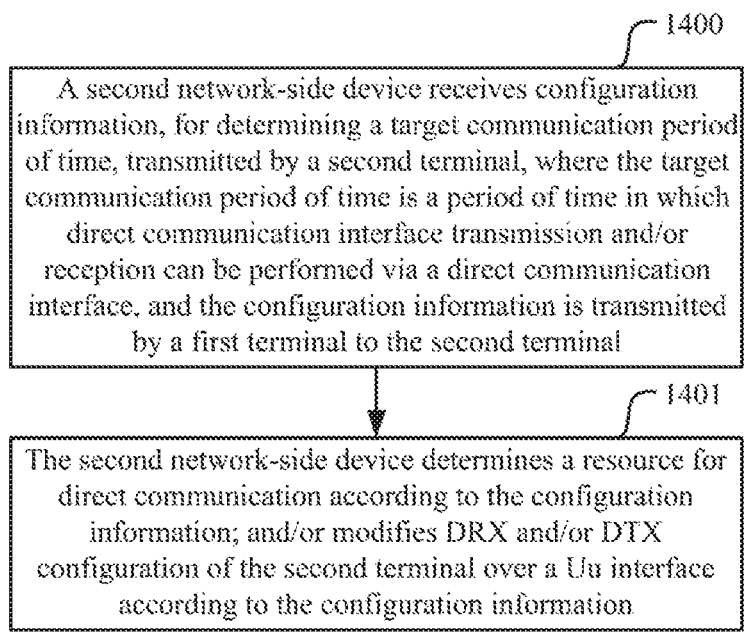
FIG. 14 is a schematic flow chart of a fourth method for configuring communication according to an embodiment of the invention.

As illustrated in FIG. 14, a fourth method for configuring communication according to an embodiment of the invention includes followings.

In the step 1400, a second network-side device receives configuration information, for determining a target communication period of time, transmitted by a second terminal, where the target communication period of time is a period of time in which direct communication interface transmission and/or reception can be performed via a direct communication interface, and the configuration information is transmitted by a first terminal to the second terminal.

In the step 1401, the second network-side device determines a resource for direct communication according to the configuration information; and/or modifies DRX and/or DTX configuration of the second terminal over a Uu interface according to the configuration information.

The solutions according to the invention will be described below in details in connection particular embodiments thereof.

Figure 15:
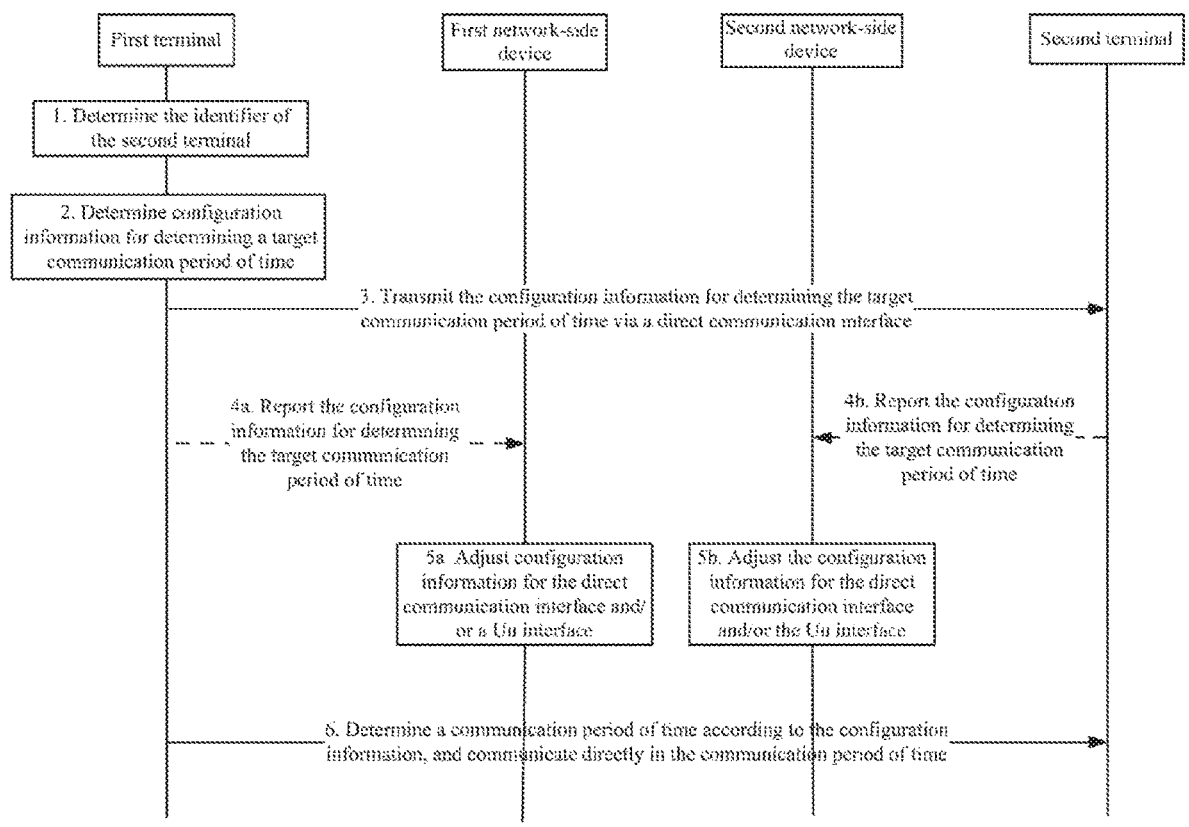
FIG. 15 is a schematic diagram of determining configuration information by a terminal according to an embodiment of the invention.

In a first embodiment, FIG. 15 illustrates a process of determining configuration information by a terminal according to an embodiment of the invention.

In the step 1, a first terminal determines identification information of an opposite end of direct communication (i.e., the identifier of a second terminal).

The identification information of the opposite end of direct communication is determined as follows.

The identification information of the opposite end of direct communication is obtained in a direct communication uni-cast connection setup procedure, that is, the second terminal notifies the first terminal of the identification information thereof in the direct communication uni-cast connection setup procedure.

For uni-cast communication, the identifiers of the first terminal and the second terminal can be L2 IDs.

For broadcast communication, the identification information of the opposite end of direct communication is an L2 group ID or an L2 broadcast ID.

In the step 2, the first terminal determines configuration information for determining a target communication period of time, where the target communication period of time is a period of time in which direct communication interface transmission and/or reception can be performed via a direct communication interface.

The first terminal can determine the configuration information according to one or a combination of the following information:

a traffic type of direct communication;

a traffic characteristic of direct communication (e.g., an interval of time at which traffic arrives);

SPS configuration of the first terminal and/or the second terminal (e.g., an SPS configuration periodicity); and DRX and/or DTX configuration information for the first terminal and/or the second terminal over a Uu interface.

Optionally the first terminal can determine the configuration information so that the configuration information matches as much as possible with configuration information for the first terminal to determine a communication period of time over the Uu interface, for example, is aligned with DRX onduration. Of course, the configuration information can alternatively be determined according to configuration information for the first terminal to determine a communication period of time over the Uu interface, and configuration information for the second terminal to determine a communication period of time over the Uu interface (for example, notified by a serving base station of the second terminal to a first network-side device, and then notified by the first network-side device to the first terminal).

In the step 3, the first terminal transmits the determined configuration information to the second terminal via the direct communication interface The message can carry the identifier of the first terminal over the direct communication interface, and the identifier of the second terminal over the direct communication interface.

The configuration information includes a part or all of the following information:

onDurationTimer;
drx-InactivityTimer;
drx-RetransmissionTimer;
LongDRX-CycleStartOffset;
LongDTX-CycleStartOffset;
ShortDRX-Cycle;
ShortDTX-Cycle;
DrxShortCycleTimer; and
DtxShortCycleTimer.

Optionally, only onDurationTimer may be applied. Any one of the other information can be applied with onDurationTimer.

In the step 4a, the first terminal transmits the determined configuration information to an accessed first network-side device.

In the step 4b, the second terminal transmits the determined configuration information to an accessed second network-side device.

Here there is no required timing relationship between the step 4a and the step 4b, but they can be performed concurrently, or can be performed separately.

In the step 5a, the first network-side device determines a resource for direct communication, and/or modifies DRY and/or DTX configuration of the first terminal over the Uu interface, according to the configuration information.

In the step 5b, the second network-side device determines a resource for direct communication, and/or modifies DRX and/or DTX configuration of the second terminal over the Uu interface, according to the configuration information.

Here there is no required timing relationship between the step 5a and the step 5b, but they can be performed concurrently, or can be performed separately.

In the step 6, the first terminal and the second terminal determine the target communication period of time over the direct communication interface according to the configuration information, and communicate directly with each other.

Optionally, a DTX and/or DTX maintenance procedure in communication can be performed in the same way as a DRX timer maintenance procedure in the 3GPP TS specification.

In an implementation, the directly transmitting terminal selects a transmit resource front active resources according to the configuration information, and the directly receiving terminal selects a receive resource from the active resources according to the configuration information.

Figure 16:
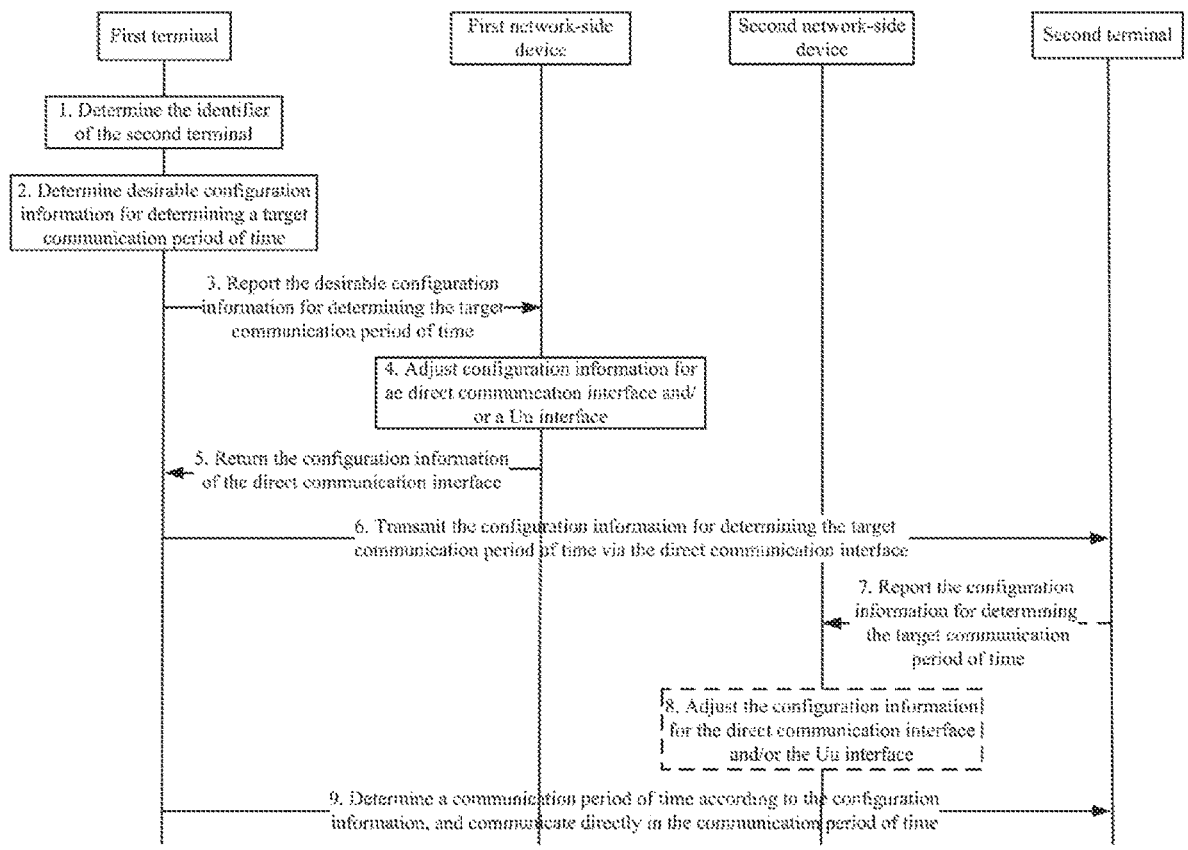
FIG. 16 is a schematic diagram of determining configuration information by a network-side device under the assistance of a terminal according to an embodiment of the invention.

In a second embodiment, FIG. 16 illustrates a process of determining configuration information by a network-side device under the assistance of a terminal according to an embodiment of the invention.

In the step 1, a first terminal determines identification information of an opposite end of direct communication (i.e., the identifier of a second terminal).

The identification information of the opposite end of direct communication is determined as follows, The identification information of the opposite end of direct communication is obtained in a direct communication uni-cast connection setup procedure, that is, the second terminal notifies the first terminal of the identification information thereof in the direct communication uni-cast connection setup procedure.

For uni-cast communication, the identifiers of the first terminal and the second terminal can be L2 IDs.

For broadcast communication, the identification information of the opposite end of direct communication is an L2 group ID or an L2 broadcast ID.

In the step 2, the first terminal determines desirable configuration information for determining a target communication period of time, where the target communication period of time is a period of time in which direct communication interface transmission and/or reception can be performed via a direct communication interface.

The first terminal can determine the configuration information according to one or a combination of the following information:

a traffic type of direct communication;

a traffic characteristic of direct communication (e.g., an interval of time at which traffic arrives);

SPS configuration of the first terminal and/or the second terminal (e.g., an SPS configuration periodicity); and DRX and/or DTX configuration information for the first terminal and/or the second terminal over a Uu interface.

Optionally, the first terminal can determine the configuration information so that the configuration information matches as much as possible with configuration information for the first terminal to determine a communication period of time over the Uu interface, for example, is aligned with DRX onduration. Of course, the configuration information can alternatively be determined according to configuration information for the first terminal to determine a communication period of time over the Uu interface, and configuration information for the second terminal to determine a communication period of time over the Uu interface (for example, notified by a serving base station of the second terminal to a first network-side device, and then notified by the first network-side device to the first terminal).

In the step 3, the first terminal reports the desirable configuration information to an accessed first network-side device.

In the step 4, the first network-side device determines resulting configuration information for determining the target communication period of time according to the received desirable configuration information, and determines a resource for direct communication, and/or modifies the DRX and/or DTX configuration of the first terminal over the Uu interface, according to the determined configuration information.

Optionally, the first network-side device can add a part or all of the current resource occupancy condition, configuration information for the first terminal to determine a communication period of time over the Uu interface, a traffic characteristic of the first terminal, and other factors in addition to the configuration information desirable to the first terminal, or the first network-side device can determine the received desirable configuration information directly as resulting configuration information, and adjust configuration information for the first terminal to determine a communication period of time over the Uu interface.

In the step 5, the first network-side device notifies the first terminal of the determined configuration information.

In the step 6, the first terminal transmits the determined configuration information to the second terminal via the direct communication interface.

The message can carry the identifier of the first terminal over the direct communication interface, and the identifier of the second terminal over the direct communication interface.

The configuration information includes a part or all of the following information:
  onDurationTimer;
  drx-InactivityTimer;
  drx-RetransmissionTimer;
  LongDRX-CycleStartOffset;
  LongDTX-CycleStartOffset;
  ShortDRX-Cycle;
  ShortDTX-Cycle;
  DrxShortCycleTimer; and
  DtxShortCycleTimer.

Optionally, only onDurationTimer may be applied. Any one of the other information can be applied with onDurationTimer.

In the step 7, the second terminal transmits the determined configuration information to an accessed second network-side device.

In the step 8, the second network-side device determines a resource for direct communication, and/or modifies DRX and/or DTX configuration of the second terminal over the interface, according to the configuration information.

In the step 9, the first terminal and the second terminal determine the target communication period of time over the direct communication interface according to the configuration information, and communicate directly with each other.

Optionally, a DTX and/or DTX maintenance procedure in communication can be performed in the same way as a DRX timer maintenance procedure in the 3GPP TS specification.

In an implementation, the directly transmitting terminal selects a transmit resource from active resources according to the configuration information, and the directly receiving terminal selects a receive resource from the active resources according to the configuration information.

Figure 17:
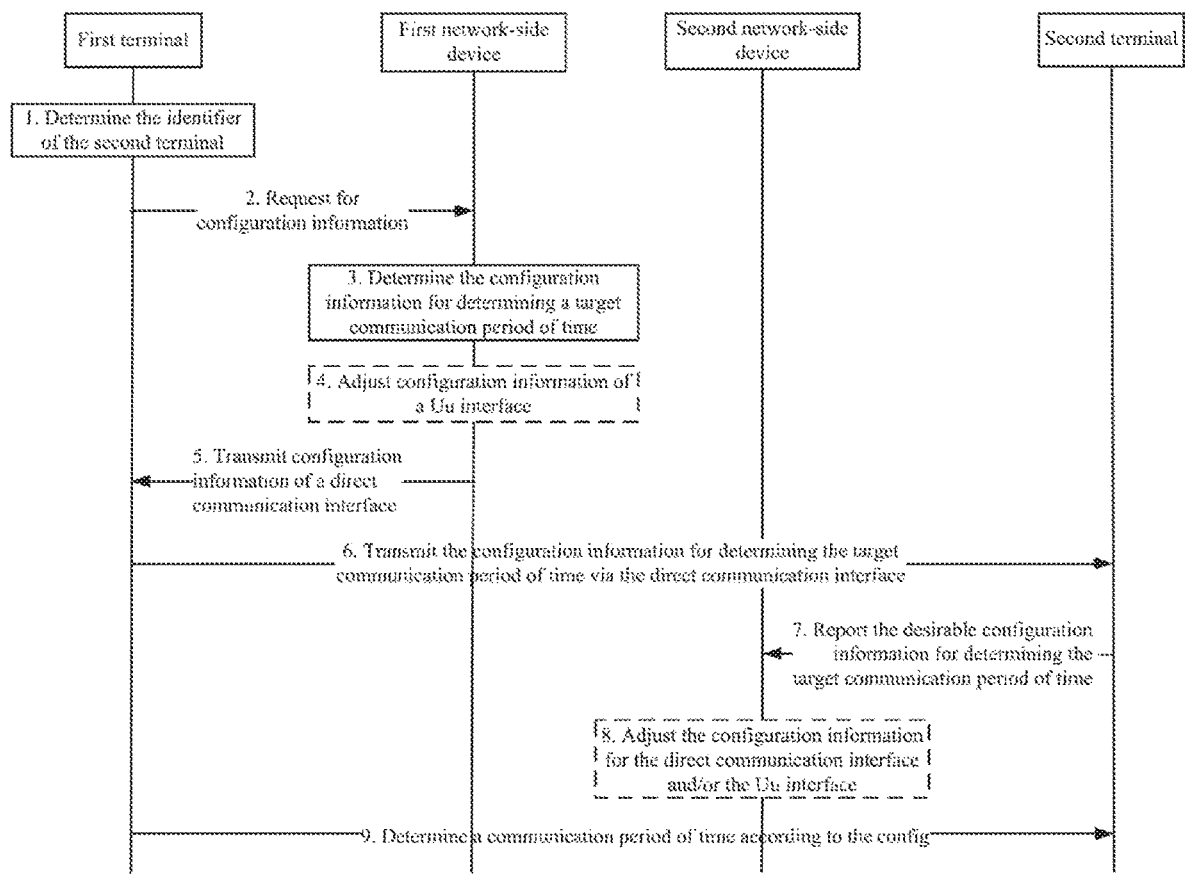
FIG. 17 is a schematic diagram of determining configuration information by a network-side device according to an embodiment of the invention.

In a third embodiment. FIG. 17 illustrates a process of determining configuration information by a network-side device according to an embodiment of the invention.

In the step 1, a first terminal determines identification information of an opposite end of direct communication (i.e., the identifier of a second terminal).

The identification information of the opposite end of direct communication is determined as follows.

The identification information of the opposite end of direct communication is obtained in a direct communication uni-cast connection setup procedure, that is, the second terminal notifies the first terminal of the identification information thereof in the direct communication uni-cast connection setup procedure.

For uni-cast communication, the identifiers of the first terminal and the second terminal can be L2 IDs.

For broadcast communication, the identification information of the opposite end of direct communication is an L2 group ID or an L2 broadcast ID.

In the step 2, the first terminal requests an accessed first network-side device for configuration information.

The first terminal can carry identification information of the first terminal and/or the second terminal in a message requesting for the configuration information, and can also carry other assistance information particularly including one or a combination of:
  a traffic type of direct communication;
  a traffic characteristic of direct communication (e.g., an interval of time at which traffic arrives);
  SPS configuration of the first terminal and/or the second terminal (e.g., an SPS configuration periodicity); and
  DRX and/or DTX configuration information for the first terminal and/or the second terminal over a Uu interface.

In the step 3, the first network-side device determines the configuration information for determining a target communication period of time, where the target communication period of time is a period of time in which direct communication interface transmission and/or reception can be performed via a direct communication interface.

Particularly, there are the following two alternatives.

In a first alternative, the first network-side device determines the configuration information for determining the target communication period of time.

In a second alternative, the first network-side device and a second network-side device negotiate about the configuration information for determining the target communication period of time.

In the second alternative, some assistance information can be exchanged between the first network-side device and the second network-side device, e.g., identification information of the first terminal and/or the second terminal, the current configuration information for the first terminal and/or the second terminal to determine a communication period of time over the Uu interface.

In either of the alternatives above, the configuration information for determining the target communication period of time can be determined so that the configuration information matches as much as possible with the configuration information for the first terminal and/or the second terminal to determine a communication period of time over the Uu interface, for example, is aligned with DRX onduration.

Of course, the configuration information can alternatively be determined according to the configuration information for the first terminal to determine a communication period of time over the Uu interface, and the configuration information for the second terminal to determine a communication period of time over the Uu interface (for example, notified by a serving base station of the second terminal to the first network-side device, and then notified by the first network-side device to the first terminal).

In the step 4, the first network-side device determines a resource for direct communication, and/or modifies the DRX and/or DTX configuration of the first terminal over the Uu interface, according to the determined configuration information, In the step 5, the first network-side device notifies the first terminal of the determined configuration information.

In the step 6, the first terminal transmits the determined configuration information to the second terminal via the direct communication interface.

The message can carry the identifier of the first terminal over the direct communication interface, and the identifier of the second terminal over the direct communication interface.

The configuration information includes a part or all of the following information:
onDurationTimer;
drx-InactivityTimer;
drx-RetransmissionTimer;
LongDRX-CycleStartOffset;
LongDTX-CycleStartOffset;
ShortDRX-Cycle;
ShortDTX-Cycle;
DrxShortCycleTimer; and
DtxShortCycleTimer.

Optionally, only onDurationTimer may be applied. Any one of the other information can be applied with onDurationTimer.

In the step 7, the second terminal transmits the determined configuration information to an accessed second network-side device.

In the step 8, the second network-side device determines a resource for direct communication, and/or modifies DRX and/or DTX configuration of the second terminal over the Uu interface, according to the configuration information.

In the step 9, the first terminal and the second terminal determine the target communication period of time over the direct communication interface according to the configuration information, and communicate directly with each other.

Optionally, a DTX and/or DTX maintenance procedure in communication can be performed in the same way as a DRX timer maintenance procedure in the 3GPP TS specification.

In an implementation, the directly transmitting terminal selects a transmit resource from active resources according to the configuration information, and the directly receiving terminal selects a receive resource from the active resources according to the configuration information.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for configuring communication, the method comprising:
determining, by a first terminal, sidelink discontinuous transmission (DTX) and/or discontinuous reception (DRX) configuration information for determining a target communication period of time, wherein the target communication period of time corresponds to active time of the DTX and/or DRX; and
determining, by the first terminal, the target communication period of time according to the sidelink DTX and/or DRX configuration information, and notifying a second terminal of the sidelink DTX and/or DRX configuration information via a direct communication interface;
wherein determining, by the first terminal, the DTX and/or DRX configuration information for determining the target communication period of time comprises:
receiving, by the first terminal, the DTX and/or DRX configuration information from a first network-side device;
wherein before the first terminal receives the DTX and/or DRX configuration information from the first network-side device, the method further comprises: transmitting, by the first terminal, desirable DTX and/or DRX configuration information to the first network-side device.

2. The method according to claim 1, wherein determining, by the first terminal, the sidelink DTX and/or DRX configuration information for determining the target communication period of time comprises:
   determining, by the first terminal, the sidelink DTX and/or DRX configuration information according to a part or all of following parameters:
   a traffic type of direct communication;
   a traffic characteristic of direct communication;
   Semi-Persistent Scheduling (SPS) configuration of the first terminal and/or the second terminal; and
   DRX and/or DTX configuration information for the first terminal and/or the second terminal over a Uu interface.

3. The method according to claim 1, wherein there is a uni-cast communication between the first terminal and the second terminal, and an identifier of the first terminal and an identifier of the second terminal are layer-2 identifiers over the direct communication interface; or
   there is a broadcast communication between the first terminal and the second terminal, and the identifier of the first terminal and the identifier of the second terminal are a layer-2 group identifier or a layer-2 broadcast identifier of the direct communication interface.

4. The method according to claim 1, wherein notifying, by the first terminal, the second terminal of the sidelink DTX and/or DRX configuration information via the direct communication interface further comprises:
   notifying, by the first terminal, the second terminal of an identifier of the first terminal, and an identifier of the second terminal together with the sidelink DTX and/or DRX configuration information.

5. The method according to claim 1, wherein the DTX and/or DRX configuration information comprises a part or all of following information:
   onDurationTimer;
   drx-Inactivity Timer;
   drx-RetransmissionTimer;
   LongDRX-CycleStartOffset;
   LongDTX-CycleStartOffset;
   ShortDRX-Cycle;
   ShortDTX-Cycle;
   DrxShortCycleTimer; and
   DtxShortCycleTimer.

6. A method for configuring communication, the method comprising:
   determining, by a first network-side device, sidelink discontinuous transmission (DTX) and/or discontinuous reception (DRX) configuration information for determining a target communication period of time, wherein the target communication period of time corresponds to active time of the DTX and/or DRX; and
   transmitting, by the first network-side device, the sidelink DTX and/or DRX configuration information to a first terminal;
   wherein determining, by the first network-side device, the sidelink DTX and/or DRX configuration information for determining the target communication period of time further comprises: determining, by the first network-side device, the sidelink DTX and/or DRX configuration information to be transmitted to the first terminal, according to received sidelink DTX and/or DRX configuration information desirable to the first terminal.

7. The method according to claim 6, wherein determining, by the first network-side device, the sidelink DTX and/or DRX configuration information for determining the target communication period of time comprises:
   determining, by the first network-side device, the sidelink DTX and/or DRX configuration information according to a part or all of following parameters:
   a traffic type of direct communication;
   a traffic characteristic of direct communication;
   SPS configuration of the first terminal and/or the second terminal; and
   DRX and/or DTX configuration information for the first terminal and/or the second terminal over a Uu interface.

8. The method according to claim 6, wherein if the parameters for determining the sidelink DTX and/or DRX configuration information comprise DRX and/or DTX configuration information for the second terminal over a Uu interface, and the second terminal does not access the first network-side device, then before the first network-side device determines the sidelink DTX and/or DRX configuration information for determining the target communication period of time, the method further comprises:
   obtaining, by the first network-side device, the current DTX and/or DRX configuration of the second terminal over the Uu interface through a second network-side device accessed by the second terminal; or
   obtaining, by the first network-side device, sidelink DTX and/or DRX configuration information desirable to the second terminal through a second network-side device accessed by the second terminal.

9. The method according to claim 6, wherein after the first network-side device determines the sidelink DTX and/or DRX configuration information for determining the target communication period of time, the method further comprises:
   determining, by the first network-side device, a resource for direct communication according to the sidelink DTX and/or DRX configuration information; and/or
   modifying, by the first network-side device, DRX and/or DTX configuration of the first terminal over a Uu interface according to the sidelink DTX and/or DRX configuration information.

10. The method according to claim 6, wherein the DTX and/or DRX configuration information comprises a part or all of following information:
   onDurationTimer;
   drx-Inactivity Timer;
   drx-RetransmissionTimer;
   LongDRX-CycleStartOffset;
   LongDTX-CycleStartOffset;
   ShortDRX-Cycle;
   ShortDTX-Cycle;
   DrxShortCycleTimer; and
   DtxShortCycleTimer.

* * * * *